United States Patent [19]
Thayer et al.

[11] 3,877,715
[45] Apr. 15, 1975

[54] AUXILIARY AXLE CONTROL SYSTEM

[75] Inventors: Earl C. Thayer, Cedarburg; William H. Buelow, Brookfield, both of Wis.

[73] Assignee: Rexnord Inc., Milwaukee, Wis.

[22] Filed: Dec. 21, 1973

[21] Appl. No.: 427,062

[52] U.S. Cl.......... 280/81 A; 180/24.02; 280/43.23; 280/150 A
[51] Int. Cl............................................. B62d 61/12
[58] Field of Search ... 180/24.02; 280/150 A, 81 A, 280/43.23, 104.5

[56] References Cited
UNITED STATES PATENTS

| | | | |
|---|---|---|---|
| 2,974,976 | 3/1961 | Lyall | 280/24.02 X |
| 3,191,961 | 6/1965 | Brennan | 180/24.02 X |
| 3,441,102 | 4/1969 | Kress | 180/24.02 |
| 3,479,049 | 11/1969 | Duecy | 280/43.23 X |
| 3,499,663 | 3/1970 | Hedlund | 180/24.02 X |
| R25,617 | 7/1964 | Lyall | 280/104.5 |

*Primary Examiner*—David Schonberg
*Assistant Examiner*—Terrance L. Siemens

[57] ABSTRACT

The drawings show and there is described herein a fluid suspension system for the rear auxiliary axle and wheels of a truck. The fluid is maintained under a preselected constant pressure so that under all normal conditions the auxiliary wheels support a part of the rear load and also transfer a part of the load from the rear wheels to the front wheels of the truck. To avoid overloading of the front wheels and axle and to avoid underloading of the rear wheels and axles when the truck is braked, a decelerometer automatically depressurizes the auxiliary axle suspension system and restores the pressure when the truck is not further braked.

5 Claims, 4 Drawing Figures

PATENTED APR 15 1975  3,877,715

AUXILIARY AXLE CONTROL SYSTEM

BACKGROUND OF THE INVENTION

U.S. Pat. No. 3,704,896 shows an improved rear auxiliary axle which is downwardly loaded by air under pressure. The air pressure is preselected by the truck operator in accordance with the load carried by the truck. Generally, when the truck is lightly or not loaded, the auxiliary axle and wheels are raised from the ground and not used. When the truck is fully loaded to its predetermined capacity, a given maximum pressure is selected by the operator and is constantly maintained under all conditions, including while braking the truck.

U.S. Pat. No. 3,317,193 shows an improved rear load-transfer device of another type which places the auxiliary axle and wheels a considerable distance to the rear of the vehicle. This type is intended for use where greater loads are allowed to be carried by the several axles of the truck according to their greater distances from each other. The auxiliary axle is usually here pressurized by a hydraulic system which includes an accumulator. The hydraulic pressure is preset and similarly constant and thus also operates irrespective of the loading of the wheels due to braking.

The object of the present invention is to avoid overloading the front axle and to avoid underloading the conventional rear axles when the brakes are applied and the truck is decelerating.

SUMMARY OF THE INVENTION

In general, the invention provides means to depressurize the rear auxiliary axle when the truck is braked hard.

More particularly the fluid supply line for pressurizing the auxiliary axle of a truck is provided with a quick-operating discharge valve controlled by a decelerometer which is carried by the vehicle and adjusted so that when the vehicle is being brought to a stop with maximum braking effect, the discharge valve is opened and the auxiliary axle is depressurized. The discharge valve automatically recloses and remains closed under all other conditions.

DESCRIPTION OF THE PREFERRED EMBODIMENT SHOWN IN THE DRAWING

Figure 1:
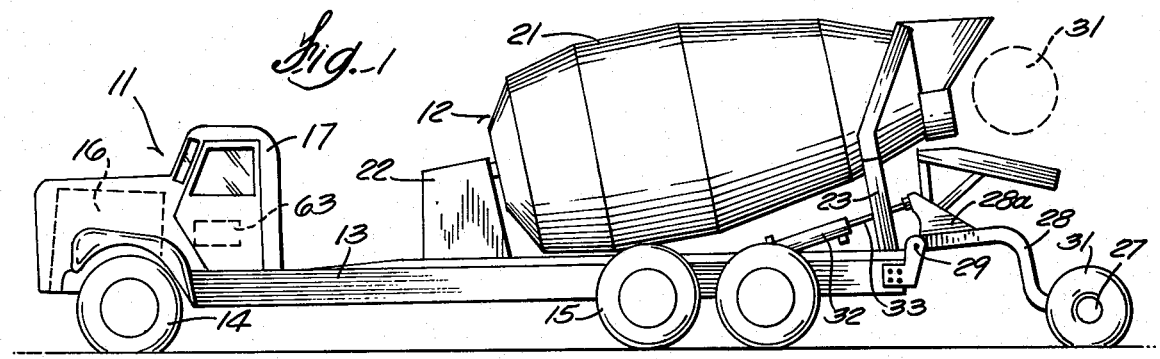
FIG. 1 shows a truck mixer with one type of rear auxiliary axle and the fluid cylinder which operates to relieve the conventional rear wheels of some of the weight of the drum and contents. The broken line shows the auxiliary wheels in the raised position.

The truck 11 shown in FIG. 1 of the drawings carries the concrete mixer 12 which is mounted at the rear of the truck on the truck frame 13. Truck 11 includes the steerable front wheels 14 and the driven rear wheels 15 which are driven by the forward engine 16. All wheels are equipped with pneumatic tires and a spring suspension system is generally also provided at least between the axle of the front wheels 14 and frame 13.

Figure 4:
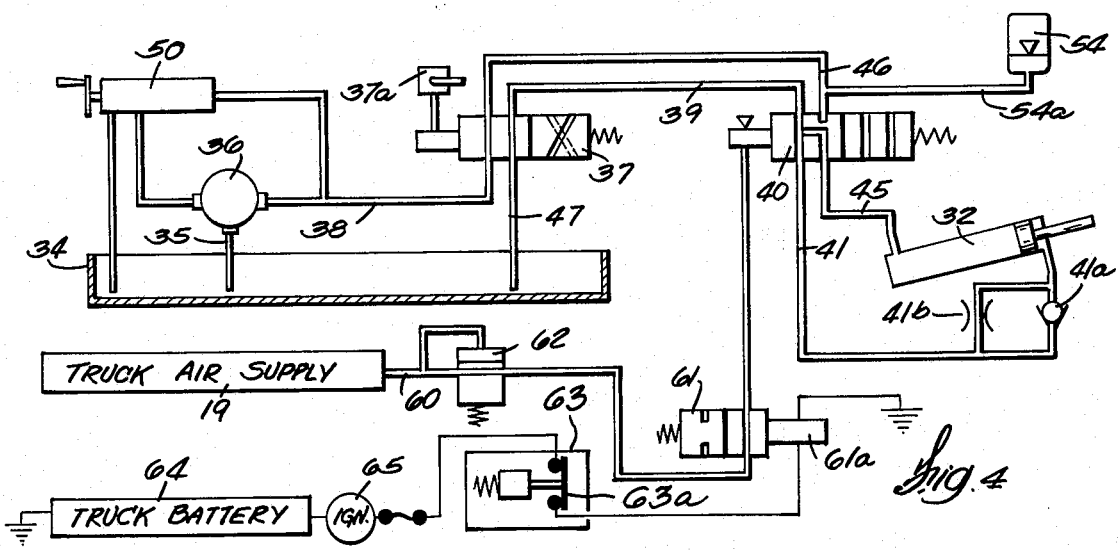
FIG. 4 is similar to FIG. 3 and additionally shows which is carried by the truck shown in FIG. 1 and the electrical and air pressure circuits by which the decelerometer operates the discharge valve.

All wheels are also provided with individual brakes which are operated by a conventional foot pedal provided in the operator's cab 17 of the truck. The brake system may be hydraulic with some power assistance derived from the truck engine, or may be operated by air pressure provided, for example, by an air compressor driven by the truck engine. In the disclosed embodiment the braking system is air operated and includes the air supply 19 (FIG. 4). Supply 19 is further utilized as shown in FIG. 4 which will be described later.

The concrete mixer 12 includes the inclined drum 21 having an opening at its upper end at the rear of the truck for receiving the concrete ingredients and for discharge of the mixed concrete. Drum 21 is supported by the forward pedestal 22 and the rear uprights 23 for rotation on its inclined axis and is driven rotationally by a hydraulic pump and motor, not shown, the motor being driven directly by the truck engine. Another supply of oil under pressure is utilized to pressurize the auxiliary axle 27 of the truck, as will be described.

The forward end of the frame extension 28 is connected to the rear end of truck frame 13 by the pivotal connection 29 and the rear end of the extension 28 is connected to axle 27 between the spaced auxiliary wheels 31 of the axle.

The hydraulic cylinder 32 located beneath drum 21 has one end connected to a cross-member of truck frame 13. The operating end of the piston rod 33 of cylinder 32 is connected to the bracket 28a of the frame extension 28 so that retraction of piston rod 33 lifts axle 27 and wheels 31 and the extension of piston rod 33 lowers axle 27 and wheels 31.

Figure 2:
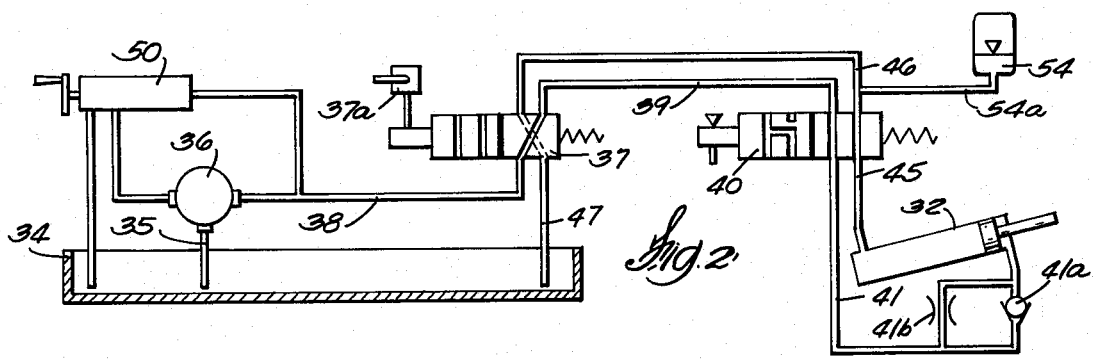
FIG. 2 is a diagram showing the elements of the fluid pressure system with the valves set for raising the auxiliary axle.
Figure 3:
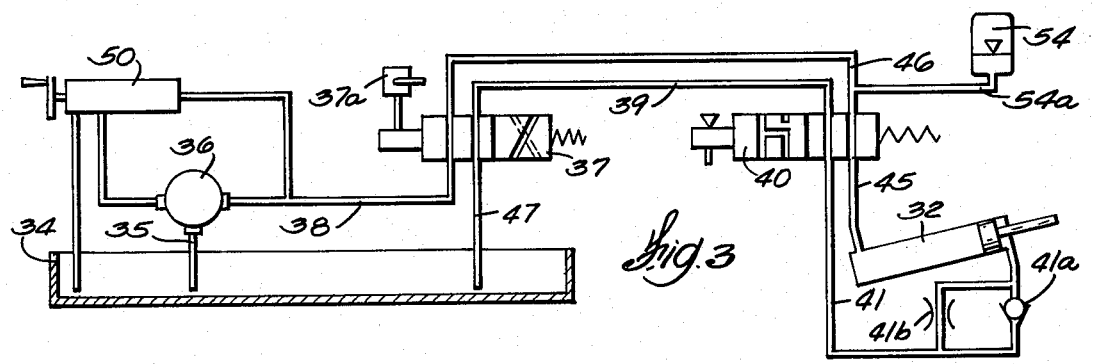
FIG. 3 is similar to FIG. 2 and shows the operator's valve set for normal pressurizing of the auxiliary axle.

FIGS. 2–4 will be described in terms of a normal truck delivery sequence commencing after the truck is on the job site.

As shown in FIG. 2, hydraulic fluid is drawn from sump 34 through line 35 by the pump 36 and is delivered under pressure to valve 37 through the supply line 38. Valve 37 is set by the operator's control lever 37a so that the fluid passes through line 39, valve 40, and the line 41 which includes the ball check valve 41a which is connected to one end of cylinder 32 to raise axle 27 and wheels 31. Check valve 41a allows the fluid to by-pass the flow restrictor 41b which is also in line 41. In raising axle 27, the fluid which is displaced from the other end of cylinder 32 passes through line 45, valve 40, line 46, valve 37 and the line 47 to sump 34. The wheels 31 are thus raised, such as to the position shown in FIG. 1, and the truck 11 is ready for return to the concrete supply plant for another load.

According to the next load to be carried, the pressure control 50 is reset if necessary to the required pressurizing of cylinder 32. Any one of various different and suitable pressure control means may be provided and is represented by the control 50 connected by lines as required to the fluid supply line 38, pump 36 and sump 34. In operation, control 50 determines the pressure of the output of pump 36 at the selected setting.

When drum 21 is loaded to the amount for which control 50 has been set, the valve 37 is operated as shown in FIG. 3 to connect supply line 38 with line 46 which delivers fluid through valve 40 and line 45 to cylinder 32 for initially lowering wheels 31. The displaced fluid from cylinder 32 flows through line 41, valve 40, line 39, valve 37 and line 47 to sump 34. The flow in line 41 must pass restrictor 41b which serves to limit the downward velocity of wheel travel until they reach the ground. Thereafter the pressure in cylinder 32 lifts the rear of truck 11 to relieve the rear wheels 15 of some weight and transfer the some weight to front wheels 14. Under such conditions, the truck is ready for travel over public roads to the job site.

In such travel, normal bumps and vertical elevation changes are accommodated by the accumulator 54 connected by line 54a to line 46. For free hydraulic flow, the lines from accumulator 54 to cylinder 32 should be short. This consideration includes also valve 40 as will be described. In the event that a large bump is encountered by wheels 31, a severe excess pressure may be developed by cylinder 32 and to relieve such pressure, suitable relief means may be provided and whatever also may be needed to protect pump 36 from such back pressure.

According to the present invention, the high-speed, air operated spring loaded valve 40 is provided to reduce the pressure in line 45 with nominal delay whenever the truck 11 is braked and is subject to deceleration of some magnitude. FIG. 4 includes diagrammatically portions of the air and electrical circuits of the truck which are utilized for such purposes, and shows valve 40 in the air-operated position. The air supply 19 may be a compressor driven by truck engine 16 and a storage tank, not shown. Supply line 60 is connected to the spring biased electrically operated valve 61 through the pressure protection valve 62 which latter assures a minimum of air pressure in supply line 19 for braking purposes. Valve 62 is normally open as shown for operation of valve 61. Valve 61 includes the operating solenoid 61a which is diagrammatically shown. The decelerometer 63 which operates valve 40 is suitably mounted on truck 11 as in cab 17 and includes the switch 63a. Switch 63a and solenoid 61a are connected in series with the truck battery 64, preferably through the ignition switch 65 and fuse 66 as shown, for example.

Decelerometer 63 may be an inertial device of a known type and is adjusted and positioned on truck 11 so that truck deceleration of a certain magnitude closes the switch 63a and causes solenoid 61a to be energized. Solenoid 61a immediately operates valve 61 and provides the air supply which then immediately operates valve 40 to close line 46 and connect lines 39, 41, and 45 to depressurize cylinder 32. That is, the fluid in cylinder 32 is allowed to flow freely from one end of the cylinder to the other and for that purpose as previously mentioned, valve 40 is located relatively near cylinder 32 to reduce friction and time delay in the flow through the hydraulic lines. Additionally, the fluid displaced by piston rod 33 flows through lines 45 and 39, valve 37 and through line 47 to sump 34.

Line 46 is closed by valve 40 so that the pressure in accummulator 54 is maintained. Thus, when switch 63a reopens, solenoid 61a is deenergized, valve 61 recloses and valve 40 returns to its normal position, as shown in FIG. 3. the fluid under pressure stored in the accummulator serves cylinder 32 in part while pump 36 must restore the operating pressure as required. The auxiliary wheels 31 then again support the portion of the weight of the truck which had been preset by the adjustment of valve 39.

The following conditions are typical of the weights in pounds of a truck which would be carried by the front wheels (F), the rear wheels in tandem (R) and the rearmost auxiliary wheels (A) when the latter are unpressurized and pressurized:

| | | |
|---|---|---|
| Unpressurized, normal: | F | 10,000 |
| | R | 52,000 |
| | A | 0 |
| Unpressurized, Braked: | F | 18,000 |
| | R | 44,000 |
| | A | 0 |
| Pressurized, Normal: | F | 18,000 |
| | R | 32,000 |
| | A | 12,000 |
| Pressurized, Braked: | F | 28,000 |
| | R | 22,000 |
| | A | 12,000 |

In the above example, the truck is, of course, equipped with tandem rear axles which have a combined 44,000 pound capacity at least under non-driving conditions. This capacity is not unusual considering that it amounts to 22,000 for each axle, that the wheels are dual and that the two axles are connected to the truck frame by load equalizing means. However, the capacity of a similarly sturdy front single axle with single wheels provided with steering is generally not over 20,000 pounds under non-driving conditions. The invention thus provides for operation of the truck under the second and third conditions so that the front axle is not overloaded and the rear axle is not underloaded as in the fourth condition. It has not been mentioned that wheels 31 are castered so that because of their distance from the wheels 15 they do not interfere with normal steering of the turck. Particularly where the auxiliary wheels are castered, underloading of wheels 15 may be dangerous in allowing the truck to move sidewise because of the reduced tracking effectiveness of the underloaded wheels.

EQUIVALENT EMBODIMENTS OF THE INVENTION

The above description of the preferred embodiment of the invention described and shown in the drawings sets forth the best made presently contemplated by the inventors and as such includes the decelerometer 63 with switch 63a. It should be understood that switch 63a may also or instead be operated when the brake pedal of the truck is fully depressed or in reponse to a high fluid pressure in the brake line. The invention is not limited to air operation of valve 40 or to the use of a liquid (oil) for pressurizing the auxiliary axle and wheels.

Although auxiliary axles operating with a constant downward force are presently pressurized either hydraulically or with air pressure, any other constant pressure device which might be unloaded and reloaded in a nominal length of time would be the equivalent thereof as to the present invention.

We claim:

1. In a conventional truck comprising a frame, a braking system, a rearmost auxiliary axle having a pressurized suspension system, said suspension system including a compression member interposed between the truck frame and the axle to lift the rear of the truck by applying constant downward force upon the axle, and control means by which said force may be preselected by the truck operator; the combination of a quick-operating device which reduces said force to a nominal value in a nominal length of time, and a sensing means which is immediately responsive to the operation of the braking system of the truck and is operatively connected to said device whereby the auxiliary axle is depressurized when the truck is being brought to a stop with maximum braking effect.

2. The improvement of claim 1 which further includes means which operates the device so that it automatically restores said preselected force after any such braking of the truck.

3. In a conventional truck having a fluid pressurized auxiliary rearmost axle, the improvement wherein the fluid supply line and means for pressurizing the auxiliary axle is provided with a decelerometer and a quick-operating discharge valve controlled by the decelerometer and which is adjustable so that during the time that the vehicle is being brought to a stop with maximum braking effect, the discharge valve is opened and the auxiliary axle is depressurized.

4. The improvement of claim 3 which further includes means which operates the discharge valve so that it automatically recloses and remains closed under all other at all other times.

5. In a load-carrying vehicle having conventional forward steering and rear drive wheels and a rearmost axle with wheels for the auxiliary support of the rear of the vehicle under maximum load conditions, said vehicle including a fluid operated braking system and said rear axle having a fluid pressurized suspension system, said latter system including a supply of fluid under pressure, manually operable means for the selection of such pressure and control means which thereupon maintains said supply at such selected pressure, and an expansible chamber device interposed between the vehicle frame and the said rearmost axle and connected to said fluid supply; the improvement in said systems which includes a quick-acting discharge valve connected to the supply of fluid of said expansible chamber device and sensing means immediately responsive to maximum operation of the braking system and operatively connected to open said discharge valve such that the fluid pressure in said chamber is then reduced in a nominal length of time to a nominal pressure whereby the load transfer to the forward wheels normally effected thereby is discontinued at least for the length of time that the braking system is being subject to maximum actuation.

* * * * *